United States Patent
Prahalad et al.

(10) Patent No.: US 8,521,860 B2
(45) Date of Patent: Aug. 27, 2013

(54) PROVIDING A WITNESS SERVICE

(75) Inventors: Prashanth Prahalad, Bellevue, WA (US); David M. Kruse, Kirkland, WA (US); Mathew George, Bellevue, WA (US); James T. Pinkerton, Sammamish, WA (US); Thomas E. Jolly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 96 days.

(21) Appl. No.: 13/074,920

(22) Filed: Mar. 29, 2011

(65) Prior Publication Data

US 2012/0254396 A1 Oct. 4, 2012

(51) Int. Cl.
*G06F 15/16* (2006.01)
(52) U.S. Cl.
USPC .......................................... 709/223; 709/224
(58) Field of Classification Search
USPC ................................................. 709/223, 224
See application file for complete search history.

(56) References Cited

U.S. PATENT DOCUMENTS

| 7,251,745 | B2 | 7/2007 | Koch |
| 7,305,450 | B2 | 12/2007 | Rescorla |
| 7,383,463 | B2 | 6/2008 | Hayden |
| 7,444,538 | B2 | 10/2008 | Sciacca |
| 7,668,962 | B2 | 2/2010 | Tran |
| 7,913,105 | B1 * | 3/2011 | Ganesh et al. ............... 709/224 |
| 2001/0047400 | A1 | 11/2001 | Coates |
| 2003/0028817 | A1 | 2/2003 | Suzuyama et al. |
| 2005/0038772 | A1 | 2/2005 | Colrain |
| 2006/0212453 | A1 | 9/2006 | Eshel et al. |
| 2006/0221815 | A1 | 10/2006 | Matsumoto |
| 2007/0124348 | A1 | 5/2007 | Claborn et al. |
| 2010/0138531 | A1 | 6/2010 | Kashyap |
| 2010/0146085 | A1 * | 6/2010 | Van Wie et al. ............... 709/220 |

OTHER PUBLICATIONS

"Microsoft Cluster Server and Failover Clustering Support", DB2 Version 9 for Linux, UNIX and Windows; <http://publib.boulder.ibm.com/infocenter/db2luw/v9/index.jsp?topic=/com.ibm.db2.udb.admin.doc/doc/c0007402.htm>; retrieved Jan. 27, 2011; 4 pages.
International Search Report and Written Opinion mailed Sep. 25, 2012 for International Application No. PCT/US2012/027796 (9 pages).

* cited by examiner

*Primary Examiner* — Adnan Mirza
(74) *Attorney, Agent, or Firm* — Merchant & Gould P.C.

(57) ABSTRACT

Described are embodiments directed at providing a witness service that sends notifications with a resource state to clients. Embodiments provide a protocol that includes various messages for registering and receiving notifications regarding the state of a resource. The protocol may include a message for requesting node information from a first node in a cluster. The node information identifies nodes in the cluster that provide a witness service, which monitors a resource. The protocol includes a message that is used to register with the witness service for notifications regarding a state, or state change, of a network or cluster resource. The protocol also includes messages for sending notifications with state information of the resource.

20 Claims, 7 Drawing Sheets

PROVIDING A WITNESS SERVICE

BACKGROUND

Server clusters are commonly used to provide failover and high availability of information to clients. Clusters typically have a cluster service that performs functions for managing cluster failover and load balancing. The cluster service typically provides fast failure detection to provide maximal service availability. From the client perspective, however, most failure detection is performed via network timeouts. If a client initiates a request to a cluster, such as a file access request or database access request, using transmission control protocol (TCP) the failure is not detected until a timeout is reached. The client waits for an acknowledgement from the server for a predefined period of time, or if the client has issued an operation and received an acknowledgement, it waits for a response from the server for a predefined period of time. The time required to detect a server failure can therefore vary from relatively fast to 30 seconds or longer. For the client to detect the failure more quickly, it has to be active (i.e., sending requests frequently) to determine that the server has failed. One way to ensure quick detection is for the client to constantly send keep-alive packets to help prevent the case of an idle client not receiving a network disconnect if the server fails. However, keep-alive packets consume network bandwidth.

It is with respect to these and other considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Described are embodiments for providing a witness service that sends notifications of a resource state to registered clients. Embodiments provide a protocol that includes various messages for registering and receiving notifications regarding the state of a resource, e.g., a resource in a cluster or a network. In one embodiment, the protocol includes a message for a client to request witness information from a node in a cluster. The witness information identifies nodes in the cluster that provide the witness service. The protocol additionally includes a message that is used to register with the witness service for notifications regarding a state, or state change, of a network or cluster resource. In one embodiment, the message is used to register for a notification of a node failure. The protocol also includes messages for the witness service to send notifications with state information of the resource. Embodiments also provide a message for unregistering from the witness service.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
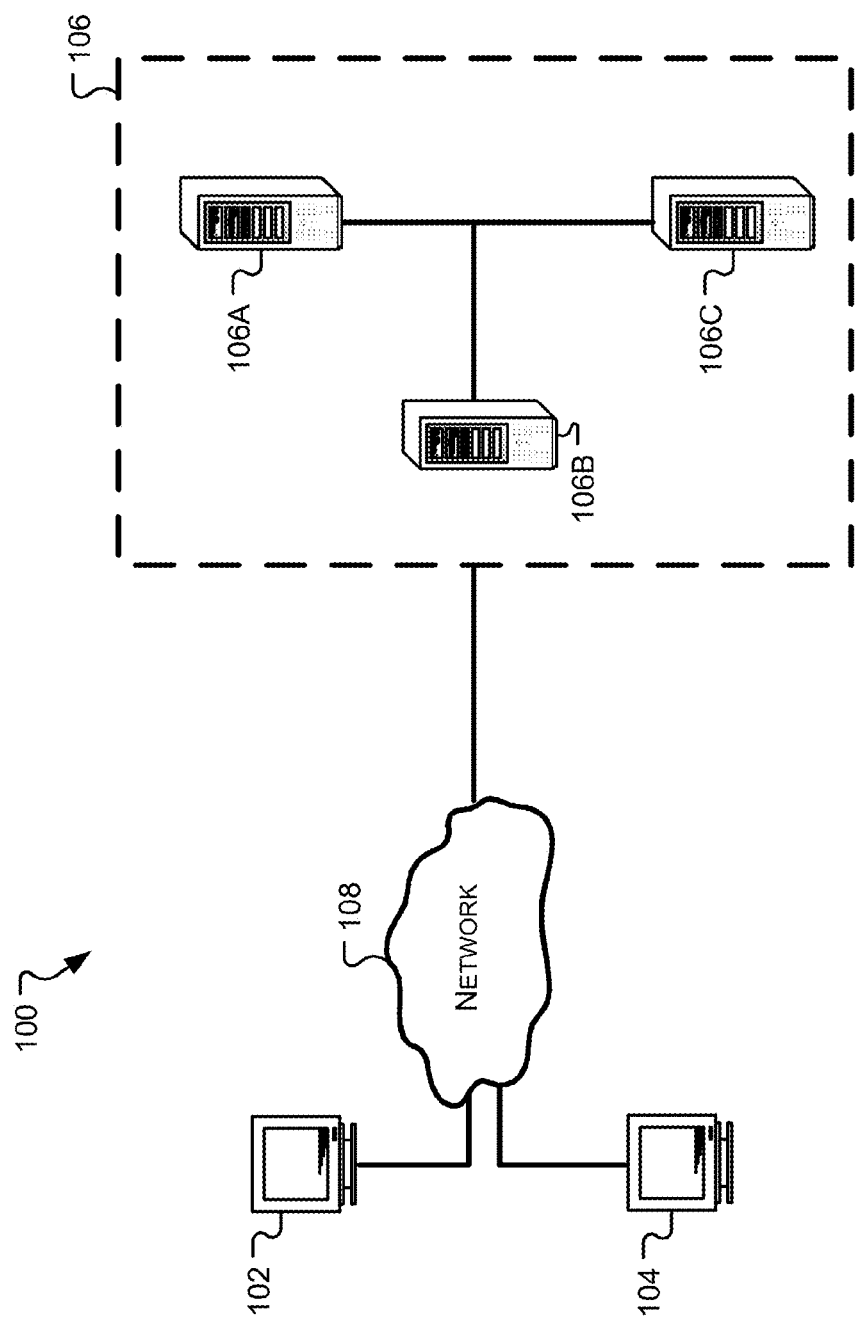
FIG. 1 illustrates a system that may be used to implement embodiments.

FIG. 1 illustrates a system 100 that may be used to implement some embodiments. System 100 includes clients 102 and 104 and a server cluster 106. Clients 102 and 104 communicate with server cluster 106 through network 108. Server cluster 106 stores information that is accessed by applications on clients 102 and 104. Clients 102 and 104 establish sessions with cluster 106 to access the information on cluster 106. Although in FIG. 1 only clients 102 and 104 are shown as communicating with cluster 106, in other embodiments there may be more than two clients accessing information from server cluster 106.

As shown in FIG. 1 server cluster 106 includes servers 106A, 106B, and 106C, which provide both high availability and redundancy for the information stored on cluster 106. In embodiments, the cluster 106 may have a file system, a database, or other information that is accessed by the clients 102 and 104. Although three servers are shown in FIG. 1, in other embodiments cluster 106 may include more than three servers, or fewer than three servers.

In accordance with one embodiment, in addition to storing information accessed by the clients 102 and 104, cluster 106 also provides a witness service. The witness service allows clients 102 and 104 to receive notifications regarding the state of resources monitored by cluster 106. The resources may be cluster resources or network resources. In one embodiment, each of servers 106A, 106B, and 106C is capable of providing the witness service. That is, clients 102 and 104 may register with any of servers 106A, 106B, or 106C for the witness service as long as the client is not using the server to access the cluster resources. In other embodiments, there may be only a portion of the servers of cluster 106 that provide the witness service. For example, in this embodiment only servers 106B and 106C would be running the witness service. In yet other embodiments, cluster 106 may include servers that are dedicated to providing the witness service. For these embodiments, although not show, cluster 106 may include servers that are specifically configured to run the witness service and would not provide access to clients 102 and 104.

The servers from cluster 106 that provide the witness service receive events from resources in cluster 106 and/or from network resources. The servers process and store information from these events to keep track of the state of these resources. In response to these events, the servers will also send out notifications to clients that have registered with the witness service to receive state information regarding the resources. As one example, the events may be generated by a cluster service that is running on cluster 106 to provide load balancing and failure detection.

As noted above, clients 102 and 104 communicate with cluster 106 to request notifications from the witness service. In embodiments, a witness protocol is provided that is used by the witness service and by clients 102 and 104. The protocol includes messages for allowing clients 102 and 104 to request information about the witness service from a server in cluster 106. The information may identify which servers in cluster 106 provide the witness service. The protocol also includes messages for registering for notifications from the witness service. The messages, sent by the witness service to the clients 102 and 104 regarding the state of a resource, are also formatted according to the witness protocol.

To illustrate one embodiment, client 102 establishes a session with a server of cluster 106. For example, client 102 may establish a session with server 106A to access a database stored on server 106A. Because client 102 is accessing information from server 106A, it may want to have an early indication of any failures on server 106A. Early detection of a failure will allow early recovery, which reduces the amount of time an application on client 102 may have to wait. Early detection and recovery also reduces the window of time where resources being reserved for client 102 to reconnect to are unavailable to other clients.

To register with the witness service, client 102 first sends a message formatted according to a witness protocol to server 106A for information regarding which server, or servers, on cluster 106 is running the witness service. Server 106A responds with the information including the identification of servers 106B and 106C as running the witness service and any information necessary to connect to any one of those servers. In this example, based on the information received from server 106A, client 102 sends a registration request to server 106B to receive notifications of the state, or state changes, of the resources on server 106A. The client will be notified when a resource on server 106A has failed, and later when the server is available for reconnection. The state can be as simple as whether server 106A is online or off-line. In other embodiments, the notifications may have a finer granularity such as whether disks or network adaptor on server 106A have failed or will be taken offline.

In some embodiments, the client 102 may have a predetermined method for selecting the specific server to contact for registering with the witness service. For example, the client can select a server at random, in a round-robin fashion, or based on information it receives from the cluster.

After client 102 has registered with server 106B for notifications regarding resources on server 106A, a change in the state of the resources detected by server 106B, results in a notification being sent to client 102 with the information indicating a change in the state of the resource. For example, the notification may indicate that server 106A is off-line. In response to the notification, client 102 may stop sending requests for information to server 106A and attempt to connect to another server in cluster 106. Alternatively, client 102 may wait for a subsequent notification that server 106A is back online so that it can reconnect and again begin accessing information from server 106A.

The following description is merely one example of how the embodiment shown in FIG. 1 may operate. As described in greater detail below, embodiments may involve different steps or operations. These may be implemented using any appropriate software or hardware component or module.

Figure 2:
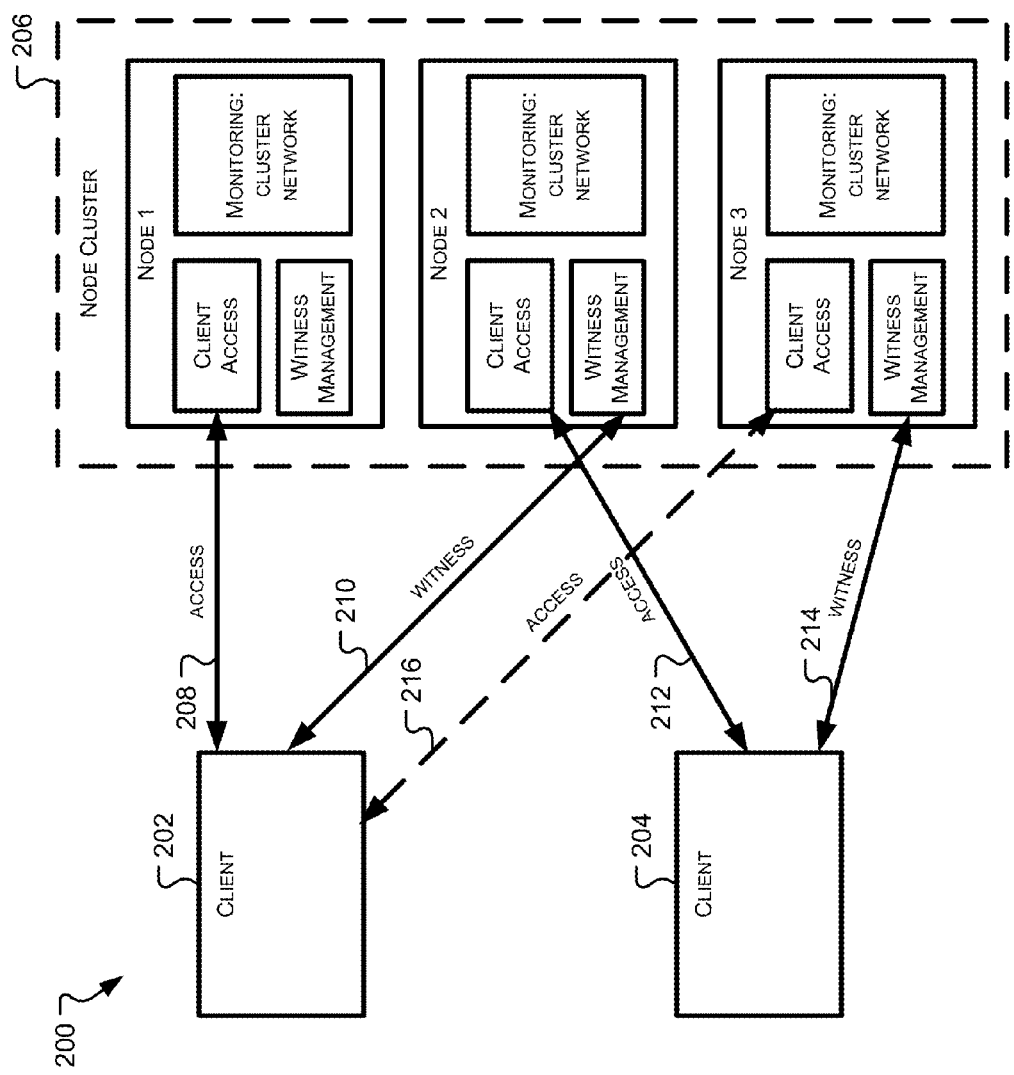
FIG. 2 illustrates a block diagram of a client and a node cluster exchanging messages using a witness protocol consistent with some embodiments.

Turning now to FIG. 2, a block diagram of a software environment 200 showing clients 202 and 204 and a node cluster 206 is shown in FIG. 2. The clients and the node cluster exchange messages using a witness protocol consistent with some embodiments. FIG. 2 is shown to illustrate a general example of an environment for using the witness protocol. The description of FIG. 2 is intended to be general and applicable to any number of situations such as clients 202 and 204 accessing a file system stored on the node cluster 206, where the node cluster 206 is a server cluster with a distributed file system. As another example, environment 200 may be used in a situation where clients 202 and 204 are accessing a database which is stored on the node cluster 206.

As shown in FIG. 2, clients 202 and 204 are accessing information provided by node cluster 206. Node cluster 206 includes three nodes, node 1, node 2, and node 3. As shown in FIG. 2, each of nodes 1, 2, and 3 include various components that communicate with clients 202 and 204. For example, each node includes a client access module which communicates with clients 202 and 204 to establish sessions for allowing the clients to access information stored on the node cluster.

In the embodiment shown in FIG. 2, nodes 1, 2, and 3 also include a witness management component that communicates with clients 202 and 204 as part of the witness service provided on node cluster 206. The witness management component provides information regarding which nodes in node cluster 206 run the witness service so that clients 202 and 204 can register with the witness service. In addition, witness management component also registers clients for notifications of resource states and also communicates with a monitoring component, shown in FIG. 2, which receives and processes events from node and network resources. The monitoring component processes the events and provides state and state change information to the witness management component, which in turn will notify any clients registered for notification of the state, or state change, of a resource. In some embodiments, the monitoring component may use API's provided by a cluster service to monitor state of resources in the cluster.

In the embodiment shown in FIG. 2, client 202 has established a session with node 1 and is sending access requests using channel 208 to the client access component of node 1. Client 202 has also initiated a separate channel (not shown) with node 1 to receive information regarding the witness service, such as which servers provide the witness service. The separate channel established with node 1 allows node 1 to communicate information regarding the witness service without interfering with the access requests sent by client 202.

In FIG. 2, client 202 has registered with the witness service provided by the witness management component on node 2. As shown in FIG. 2, the communication with the witness management component occurs over a separate channel 210. Accordingly, any type of witness information including state notifications does not interfere with the access requests over channel 208. Channel 216, shown in dashed lines, illustrates a separate channel that client 202 establishes to send access requests in the event of a failure of resources on node 1. In some embodiments, the witness management component provides information indicating a new resource for client 202 to send access requests in the event of a failure, and also a recommended network path or a number of recommended network paths for connecting to the new resource.

Similarly, client 204 has established a session with node 2 and is sending access requests over channel 212 to the client access component of node 2. Client 204 has also registered for a witness service and is communicating using channel 214 with the witness management component of node 3.

In one embodiment, the witness management components provide additional functionality. In some embodiments, the components provide a load balancing functionality. That is, in addition to sending notifications regarding state of resources, the witness management components may also send notifications that request that clients 202 and 204 connect to different resources based on an algorithm for load-balancing on the node 206. For example, as shown in FIG. 2, client 202 is communicating with the client access component of node 1. Additionally, client 202 is communicating with a witness management component of node 2, which is providing client 202 with notifications of any state changes of resources such as failure of resources in node 1. In this embodiment, witness management component of node 2 may determine that node 1 is performing poorly (e.g., high latency) because of an excessive amount of access requests being serviced by node 1. As another example, a determination may be made to off load clients from node 2 to allow node 2 to be shut down for power savings or other reasons such as maintenance. In accordance with an algorithm, node 2 may send a notification to client 202 indicating that it should begin sending any future access requests to node 3, which may be underutilized. Client 202 would then establish a session as illustrated in dashed lines as channel 216 with node 3 to send future requests. In other embodiments, the witness management component provides information indicating, not only a new resource for client 202 to send access requests, but also a recommended network path or a number of recommended network paths.

Figure 3:
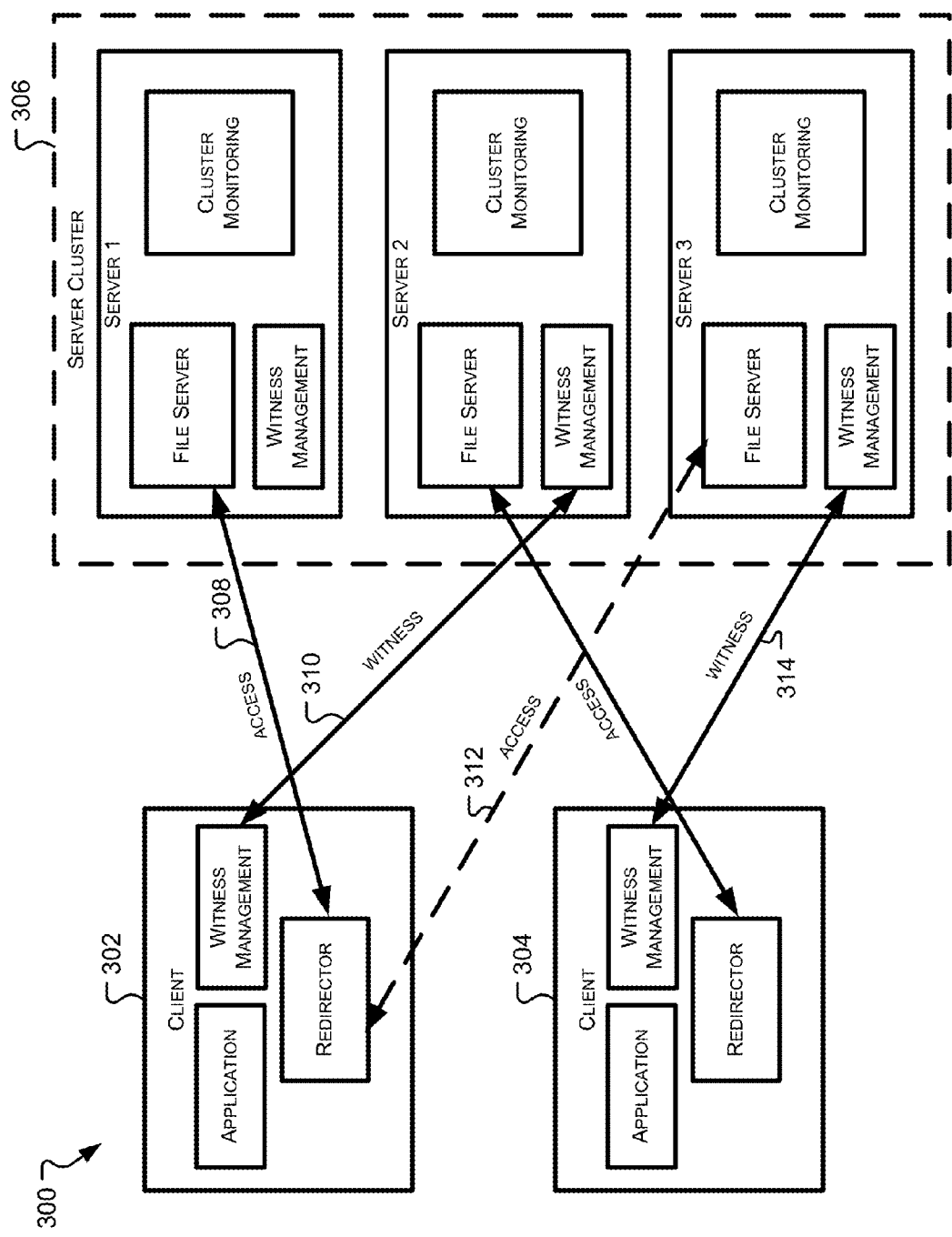
FIG. 3 illustrates a block diagram of a client and file server cluster communicating using a file access protocol and a witness protocol consistent with some embodiments.
Figure 4:
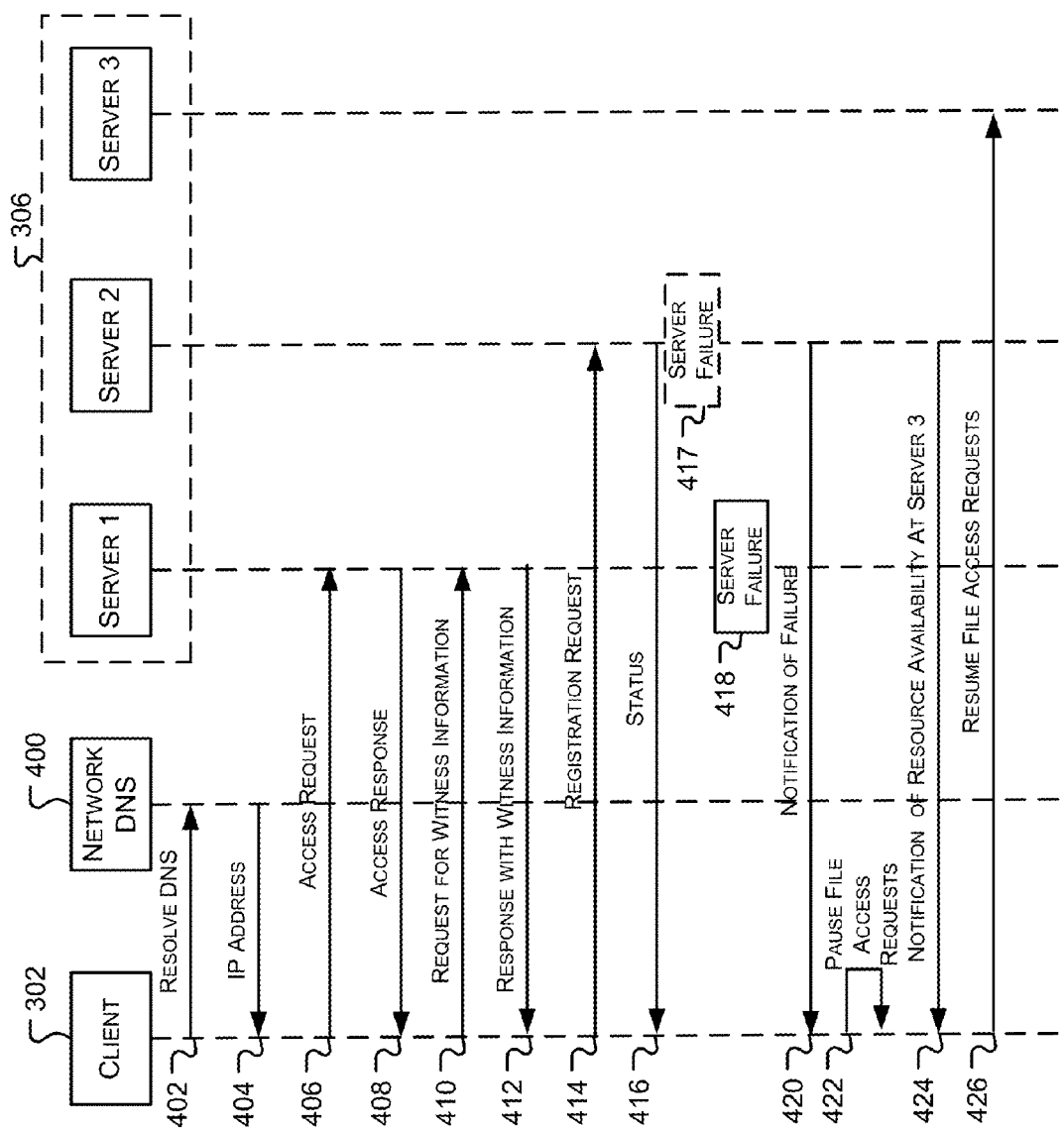
FIG. 4 illustrates a sequence diagram showing a sequence of messages that may be exchanged in the embodiment shown in FIG. 3.

FIG. 3 illustrates an environment 300 similar to environment 200 described in FIG. 2. However, environment 300 shows clients 302 and 304 requesting read/write access to a file server that is on server cluster 306. Server cluster 306 includes server 1, server 2, and server 3, each of which include a file server, a witness management component, and a cluster monitoring component. In the embodiment, shown in FIG. 3, clients 302 and 304 include an application, a witness management component, and a redirector. FIG. 4 illustrates a sequence diagram showing one example of messages that can be exchanged within environment 300 according to an embodiment.

The description of FIGS. 3 and 4 below is made using the server message block (SMB) protocol as the file access protocol. However, embodiments are not limited thereto. Any file access protocol including different versions of SMB or the network file system (NFS) may be used in embodiments as the file access protocol. SMB is being used in the description merely for convenience and ease of illustration.

Referring to FIG. 4, the sequence diagram illustrates messages exchanged between client 302 (FIG. 3), a network DNS 400, and server cluster 306 (FIG. 3) according to one embodiment. Client 302 first sends a request 402 to the network DNS 400 to resolve the IP address of the server cluster 306, which stores a file system that can be accessed using a version of SMB. In response to the request 402, network DNS 400 responds with a message 404 that includes the IP address of the server cluster 306.

After receiving response message 404, client 302 sends an access request message 406 to server cluster 306. The access request may be sent by the redirector on client 302. As shown in FIGS. 3 and 4, server 1 handles the request from client 302. As shown in FIG. 3, server 1 includes a file server component that communicates with the redirector on client 302 to establish the file access sessions. In embodiments, the request 406 may be a first request to negotiate an SMB session. For example, the request may be an SMB2 negotiate packet. As illustrated in FIG. 4, server 1 sends an access response 408, which establishes a session with client 302. The response may be for example an SMB2 session setup response or an SMB2 tree connect response.

It is to be noted that although FIG. 4 and the associated description provides for a single access request 406 and a single access response 408, in embodiments these may just be two messages of a number of messages that are sent in order to establish a session. As may be appreciated, to establish a session using the SMB2 protocol a number of messages may be exchanged between the redirector on client 302 and the file server on server 1. The messages may include one or more of SMB2 negotiate messages, SMB2 session setup messages, and/or SMB 2 tree connect messages. After the session has been established, client 302 begins to send access requests (not shown), e.g., file and/or directory read/writes, to server 1 of cluster 306 over the established channel 308 (FIG. 3).

The witness management component on client 302 detects that server 1 is part of cluster 306. This detection may occur in embodiments as part of processing the response message 408 or by some other out of bounds means. As a result of determining that server 1 is part of cluster 306, the witness management component on client 302 is configured in embodiments to register for the witness service provided by cluster 306. As a result, the witness management component on client 302 uses a new channel 310 (FIG. 3) to send a request 410 for witness information from server 1.

In embodiments, the request is formatted according to a witness protocol that is configured specifically for the witness service. The witness protocol may include a number of messages related to the witness service. For example, in embodiments, the witness protocol includes at least: a witness request message to request witness information, a witness register message for registering for notifications about a resource in a cluster, and a witness resource change message for notifying clients of a change in state of a resource (e.g., online or offline status of a resource.). These are merely some examples and in embodiments, the witness service may include other messages. In one embodiment, the witness protocol uses Remote Procedure Call (RPC) with Transmission Control Protocol (TCP) as the transport.

Referring again to FIG. 4, the witness management component of server 1 responds to request 410 with response 412 that includes the witness information. Response 412 is formatted according to the witness protocol and will include information that identifies the other servers in cluster 306 that provide the witness service. In embodiments, response 412 also includes other information that is necessary for client 302 to connect to the witness service on one of the other servers of cluster 306. In this example, the witness information in response 412 includes information that identifies at least server 2 as providing the witness service.

In some embodiments, the witness information is structured in a particular format. For example, the witness information may be ranked. That is, the servers that provide the witness service may be listed in a particular order. Client 302 can then start with the first server in the list, and if that server is unavailable to provide the witness service, the client can then try the next server on the list. The ranking can be based on a number of different algorithms that take into account parameters some non-limiting examples including: the number of clients that have registered for the witness service, the servers that are providing the witness service, as well as the hardware and software characteristics of particular servers and network connections, which may indicate an ability to handle larger amounts of clients.

In response to the witness information received from server 1, client 302 will use channel 310 (FIG. 3) to send a registration request 414 to server 2. The registration request 414 is also formatted according to the witness protocol and includes information that identifies the resources about which client 302 wishes to receive notifications. In one example, client 302 may wish to know when server 1 is off-line so that it has an early indication of the failure of server 1. Detecting the failure will allow early recovery, which reduces the amount of time the application on client 302 waits to have an operation (e.g., read/write) processed. In this example, client 302 registers with the witness management component of server 2 for notifications regarding the online/off-line state of server 1. Server 2 sends a status response 416 that acknowledges the registration request. In embodiments, the response 416 will also include the current state of the resources about which client 302 has registered to receive notifications.

In some embodiments, after operation 416, the witness server (server 2) might experience a failure, server failure 417 shown in dashed lines. In this case, the client 302 would have to re-select an alternate server, including in some embodiments sending another message similar to messages 410 and receiving another message similar to message 412 (from server 1 or a different server). Client 302 would also send a witness registration request similar to request 414 to register for the witness service from the alternate server.

In other embodiments, the client could establish multiple witness server connections. That is, the client can register with more than one server in cluster 306 for the witness service. The multiple connections would allow the client to continually have access to the witness service even if one of the servers fails. The client may in embodiments designate one of the connections as a primary connection and use the other connections only secondarily, if the primary connection should fail.

If at some point there is a server failure 418 of server 1, server 2 will detect the failure. As noted above, server 2 may detect the failure by receiving events generated by a cluster service running on cluster 306. Once server 2 detects the server failure 418, server 2 will send a notification 420 of the failure to client 302. In response to the failure, client 302 is in this embodiment configured to pause any further file access requests 422. As can be appreciated, if client 302 were to send any additional access requests, they would not be processed because of the failure of server 1. The witness service of server 2 is also in embodiments configured to send a message 424 to client 302 indicating that there is a resource available at server 3 for processing access requests from client 302.

After receipt of message 424, client 302 will resume sending file access requests 426 to server 3. The redirector on client 302 sends the file access requests 426 through channel 312 (FIG. 3) to the file server component of server 3.

In other embodiments, client 302 is configured to pause file access requests until server 1 is back online. The witness service of server 2 would be configured to send a message 424 to client 302 indicating that server 1 is available for processing access requests from client 302, when server 1 becomes available.

Although not shown, in some embodiments, when client 302 begins to send file access requests to server 3, it will also change the server from which it is receiving the witness service. For example, after sending file access requests to server 3, client 302 may begin the process of sending a request for witness information to server 3. Server 3 may respond with information similar to response 412 sent by server 1, including information regarding which servers are providing the witness service. The information may be different, for example it may identify different servers. Servers that were previously identified as providing the witness service may have since failed and are no longer available, or other servers have come online. Also, in some embodiments, the witness management components are configured to provide the witness information with rankings of the servers that are available for providing the witness service. The witness information provided by server 3 may therefore be different than the witness information previously provided by server 2. In response to the witness information sent by server 3, client 302 may decide whether to request registration for the witness service from a different server.

Figure 5:
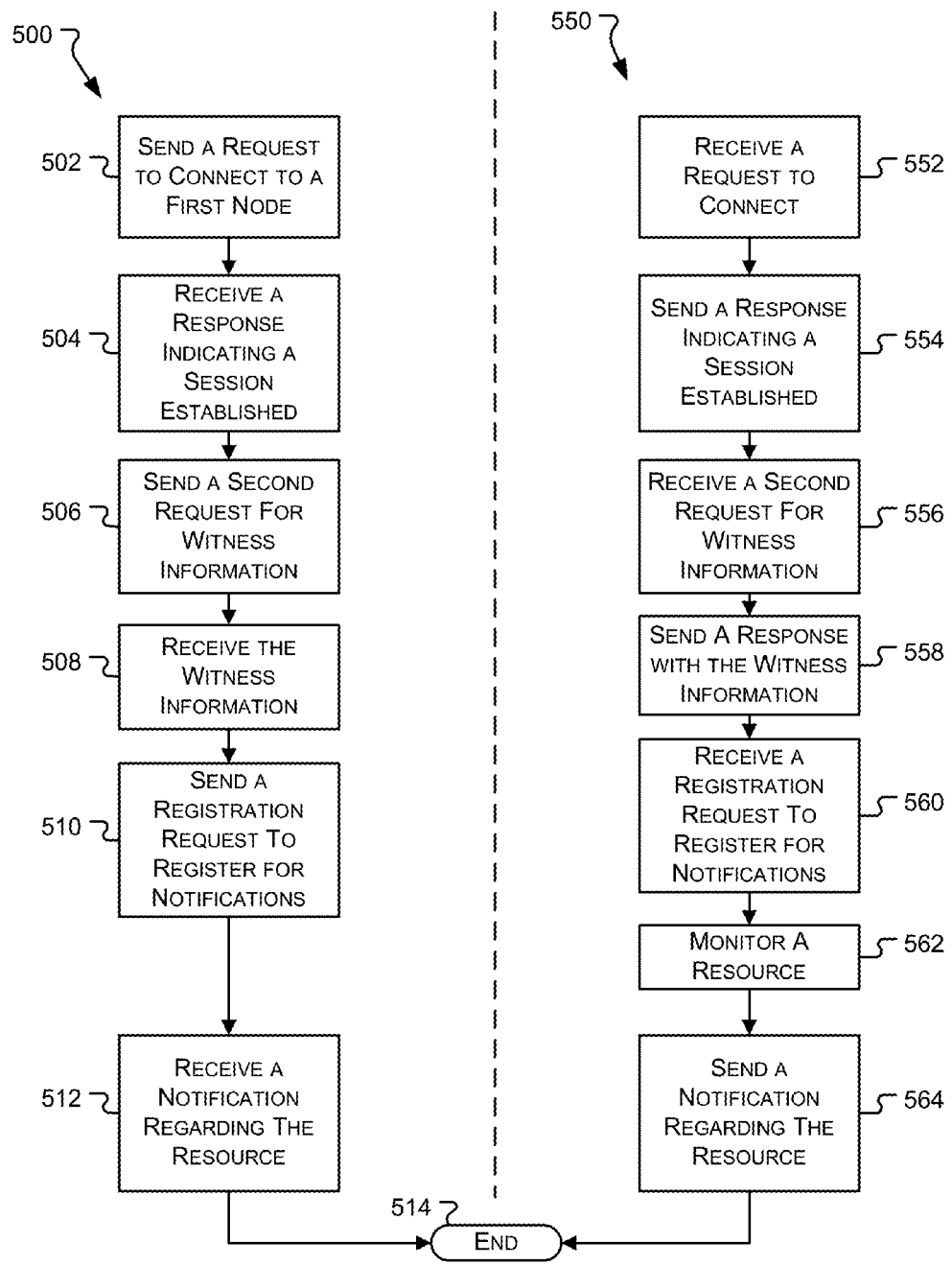
FIG. 5 illustrates operational flows for receiving and providing state notifications of resource state information consistent with some embodiments.
Figure 6:
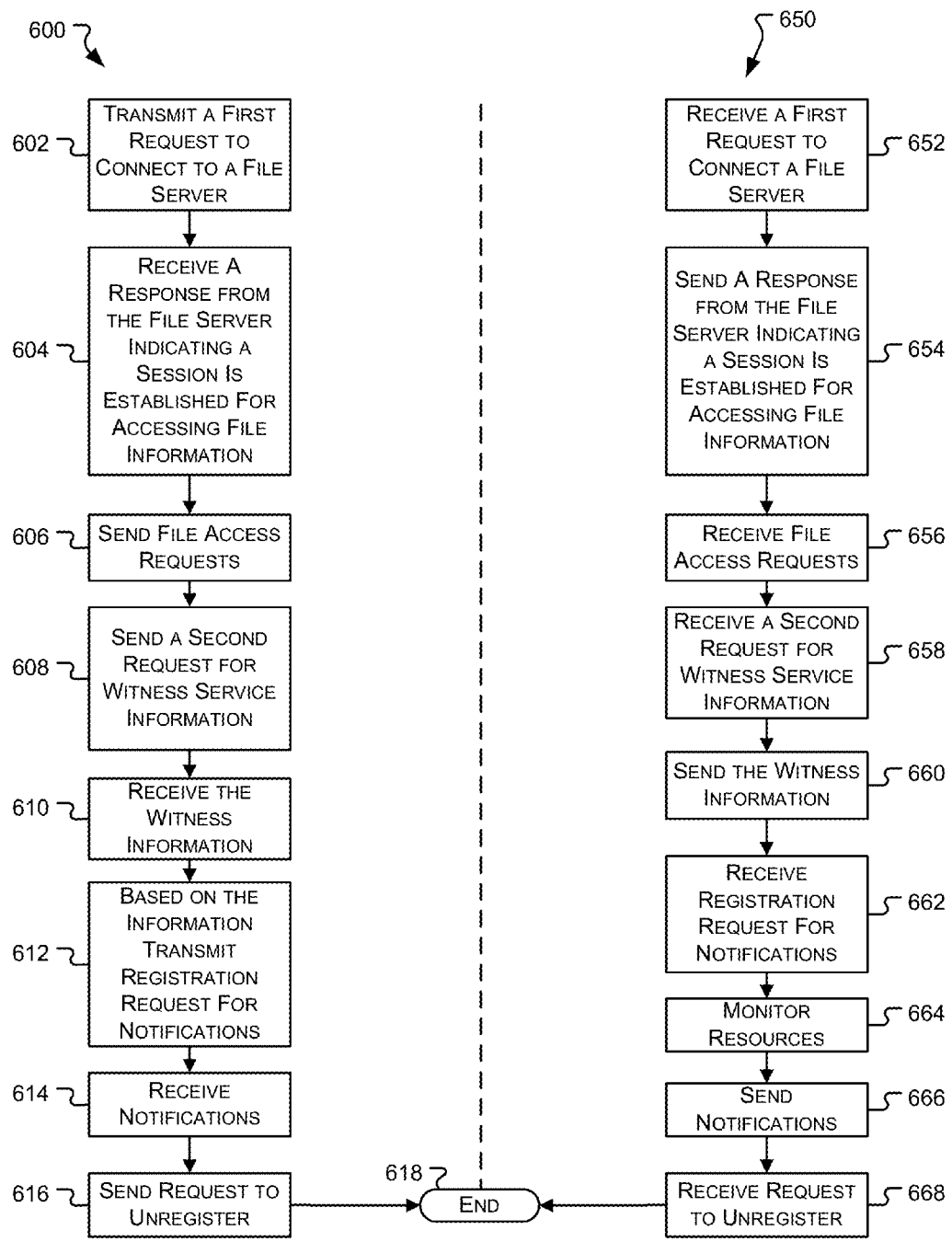
FIG. 6 illustrates operational flows for receiving and providing state notifications of cluster resources consistent with some embodiments.

FIGS. 5 and 6 illustrate operational flows 500, 550, 600, and 650 according to embodiments. Operational flows 500, 550, 600, and 650 may be performed in any suitable computing environment. For example, the operational flows may be executed by systems and environments such as illustrated in FIGS. 1-3. Therefore, the description of operational flows 500, 550, 600, and 650 may refer to at least one of the components of FIGS. 1-3. However, any such reference to components of FIGS. 1-3 is for descriptive purposes only, and it is to be understood that the implementations of FIGS. 1-3 are non-limiting environments for operational flows 500, 550, 600, and 650.

Furthermore, although operational flows 500, 550, 600, and 650 are illustrated and described sequentially in a particular order, in other embodiments, the operations may be performed in different orders, multiple times, and/or in parallel. Further, one or more operations may be omitted or combined in some embodiments.

Operational flows 500 and 550 are illustrated together in FIG. 5 to show that steps in operational flow 500 may have corresponding steps in operational flow 550. Operational flow 500 illustrates steps for receiving state notifications for a resource. Operational flow 550 illustrates steps for providing state notifications for a resource. In embodiments, clients such as clients 102 and 104 (FIG. 1) or clients 202 and 204 (FIG. 2) described above may implement operational flow 500. The clients that implement operational flow 500 may be any type of client, including laptop computers, desktop computers, smart phone devices, or tablet computers. In embodiments, nodes such as node 1, node 2, and node 3, shown in FIG. 2, implement operational flow 550. The nodes may be part of a node cluster that runs a cluster service.

Flow 500 begins at operation 502 where a request to connect to a first node is sent. The first node is part of a node cluster that stores information that is accessed. In some embodiments, the request sent at operation 502 is a request to establish a session with the first node in order to access information stored on the node cluster. After operation 502, flow 500 passes to operation 504 where a response is received indicating that a session with the first node has been established. Although not shown in flow 500, in embodiments, after operation 504 access requests are sent to the first node to access information stored on the first node.

As shown in the embodiment in FIG. 5, operational flow passes from operation 504 to operation 506 where a second request is sent to the first node for witness information. The witness information identifies what nodes in the cluster provide a witness service that can be registered with to provide notifications for a resource. The resource may be for example a network resource or a cluster resource.

At operation 508 the witness information is received. The witness information can then be used to determine what node in the cluster provides the witness service. The witness information is used at operation 510 to send a registration request to register for notifications regarding a resource. In one embodiment, the resource may be the first node from which information is being accessed. The request may be to receive notifications regarding the state of the first node, or resources on the first node. For example, the notifications may indicate whether the first node is online or off-line.

Flow 500 passes from operation 510 to operation 512 where a notification is received regarding the resource. Flow 500 then ends at operation 514. In some embodiments, there may be additional steps performed in response to receipt of the notification at step 512, such as a pausing of access requests, reconnection to another node in the cluster, and resumption of access requests to the other node in the cluster.

In embodiments, the notification received at operation 512 is not a state notification but rather a load balancing notification. The load balancing notification may indicate that future access requests should be sent to a different server. In some embodiments, the notification may specifically identify a different network, network resource, or cluster resource that should be used. In these embodiments, a number of operations would be performed in response to receipt of the notification at operation 512.

Flow 550 has corresponding steps to those described above with respect to flow 500. As noted above, in embodiments, node 1, node 2, and node 3 shown in FIG. 2 may implement flow 550. Flow 550 begins at operation 552 where a request to connect to a node in a node cluster is received. The request may be a request to establish a session for accessing information stored on the node cluster. Flow passes from operation 552 to operation 554 where a response is sent indicating that a session has been established to allow access to information stored on a first node in the node cluster. In some embodiments, operation 554 will be followed by additional steps not shown in flow 550. For example, once the session has been established as indicated in the response sent at operation 554, there may be a number of access requests that are received to access information stored in the first node of the node cluster.

After operation 554, a second request for witness information is received at operation 556. The witness information may include information that identifies what nodes in the node cluster provide a witness service. Flow 550 passes to operation 558 where a response is sent that includes the witness information. In embodiments, the witness information is structured so that not only does it include indications of the nodes in the node cluster that provide the witness service but also is ranked to indicate a preference for some nodes.

At operation 560, a registration request to register for state notifications for a resource is received. In embodiments, the request is for state notifications for network resources. In other embodiments, the request is for state notifications for cluster resources such as whether or not a node in the cluster is online or off-line. It is to be understood that the request received at operation 560 is in embodiments received from a client that is different than the client sending the first request (operation 552) and the second request (operation 556). Although the requests received during flow 550 may be sent by different clients, operations 552-564 is in embodiments performed by a single node.

After operation 560, flow passes to operation 562 where a resource is monitored. Operation 562 may include monitoring a number of resources including cluster resources and network resources. The resources may be monitored even if there is no current request to receive notifications about the resource. Operation 562 may include receiving and processing events from network resources or from a cluster service.

After operation 562, flow passes to operation 564 where a notification regarding the resource is sent. The notification provides information regarding the state of the resource that was indicated in the registration request received at operation 560. In one embodiment, the notification may indicate that the first node is off-line. After operation 564, flow ends at operation 514. In embodiments, flow 550 may include additional steps performed after operation 564. As one example, there may be an additional message sent indicating that the resource that was previously off-line is now online and available for access or that another resource is available.

It should be noted that in some embodiments, operations 552-558 are performed in one location and operations 560-564 are performed in a different location. For example, operations 552-558 may be performed on a different node of a node cluster then the node that performs operations 560-564. In other embodiments, a single node may perform all of operations 552-564 however, operations 552-558 may be performed with respect to a first client and operations 560-564 may be performed with respect to a second client. In other words, a node may be servicing requests to access information from a first client and also provide the witness service to a second client.

Operational flow 600 illustrates steps for receiving state notifications for a cluster resource from a cluster providing a distributed file system to clients. Operational flow 650 illustrates steps for providing state notifications for a cluster resource on a cluster providing a file system. In embodiments, clients such as clients 102 and 104 (FIG. 1) or clients 302 and 304 (FIG. 3) described above may implement operational flow 600. In embodiments, servers of server cluster 306 such as server 1, server 2, and server 3, shown in FIG. 3, implement operational flow 650.

Flow 600 begins at operation 602 where a request to connect to the file system on a server cluster is sent. The server cluster includes more than one server and stores file information that is accessed by clients. In some embodiments, the request sent at operation 602 is a request to establish a session with a server in the server cluster in order to access files on the cluster. The session is in embodiments established with a file access protocol such as a version of SMB or NFS. After operation 602, flow passes to operation 604 where a response is received indicating that a session with a server in the cluster has been established. Operations 602 and 604 may be only two operations in a series of operations that are performed to negotiate the session. That is, in other embodiments there may be a number of operations that are performed between operation 602 and 604.

After operation 604, access requests are sent at operation 606 to the server to access information from the file system stored in the server cluster. The access requests may include for example read/write requests that are formatted according to a particular file access protocols such as a version of SMB or a version of NFS.

As shown in the embodiment in FIG. 6, operational flow passes from operation 606 to operation 608 where a second request is sent to the server for witness service information. The witness service information, among other things, identifies what servers in the cluster provide a witness service that can be registered with to provide notifications for a cluster resource. The request sent at operation 608 may be formatted according to a witness protocol that is different from the file access protocol used in operations 602-606.

At operation 610 the witness service information is received. The witness service information can then be used to determine what server in the cluster provides the witness service. The witness service information is used at operation 612 to send a registration request to register for notifications regarding a cluster resource. In one embodiment, the resource may be the server with which the session was established at operation 604 and from which information is being accessed using the requests sent at operation 606. The registration request may indicate that the client wishes to receive notifications regarding the state of the server.

Flow 600 passes from operation 612 to operation 614 where a notification is received regarding the resource. In some embodiments, there may be additional steps performed in response to receipt of the notification at step 614, such as a pausing of the access requests, reconnection to another server in the cluster, and resumption of access requests to the other server in the cluster. After operation 614, a request to unregister is sent at operation 616. Flow 600 then ends at operation 618.

Flow 650 has corresponding steps to those described above with respect to flow 600. Flow 650 begins at operation 652 where a request to connect to a server cluster is received. The request is in embodiments a request to establish a session for accessing file information stored on the server cluster. The operation occurs on a file server of the server cluster. Flow passes from operation 652 to operation 654 where a response is sent indicating that a session has been established to allow access to the files stored on the file server in the server cluster. As noted above, operation 652 and operation 654 may merely be two operations that are performed to establish a session. In some embodiments, there may be a number of other operations that are performed between operation 652 and operation 654 for establishing the session.

Operation 654 is followed by operation 656 where file access requests are received. The file access requests may be requests to read or write file information stored on the server. In embodiments, the messages sent and received at operations 652-656 are formatted according to a file access protocol, such as a version of SMB or a version of NFS.

After operation 656, a request for witness information is received at operation 658. The request is for witness information regarding what servers in the server cluster provide a witness service. Flow 650 passes to operation 660 where a response is sent that includes the witness information with indications of the servers in the server cluster that provide the witness service. It is to be understood that the request received at operation 658 is in embodiments received from a client that is different than the client sending the first request (operation 652) and the second request (operation 658). Although the requests received during flow 650 are sent by different clients, operations 652-668 is in embodiments performed by a single node.

At operation 662, a registration request to register for state notifications for a cluster resource is received. In embodiments, the request is for state notifications for cluster resources such as whether or not the server, that is servicing the file access requests and with which the session has been established, is online or off-line. After operation 662, flow passes to operation 664 where a resource is monitored. Operation 664 may include utilizing APIs provided by a cluster service running on the cluster. Operation 664 may include receiving and processing events received from the cluster service.

After operation 664, flow passes to operation 666 where a notification regarding the resource is sent. The notification provides information regarding the state of the resource that was indicated in the registration request received at operation 662. In one embodiment, the notification may indicate that the server is now off-line. After operation 666, flow passes to operation 668 where a request to unregistered is received. The request received at operation 668 indicates that a previous registration, such as the registration request received at operation 662, should be unregistered. Flow 650 ends at operation 618.

It should be noted that in embodiments, operations 652-658 are performed on one server and operations 660-664 are performed on a different server. For example, operations 652-658 may be performed on a first server of a server cluster and operations 660-664 on a second server of the server cluster. In other embodiments, a single server may perform all of operations 652-664 however, operations 652-658 may be performed with respect to a first client and operations 660-664 may be performed with respect to a second client. In other words, a server may be servicing requests to access information from a first client and also provide the witness service to a second client.

Figure 7:
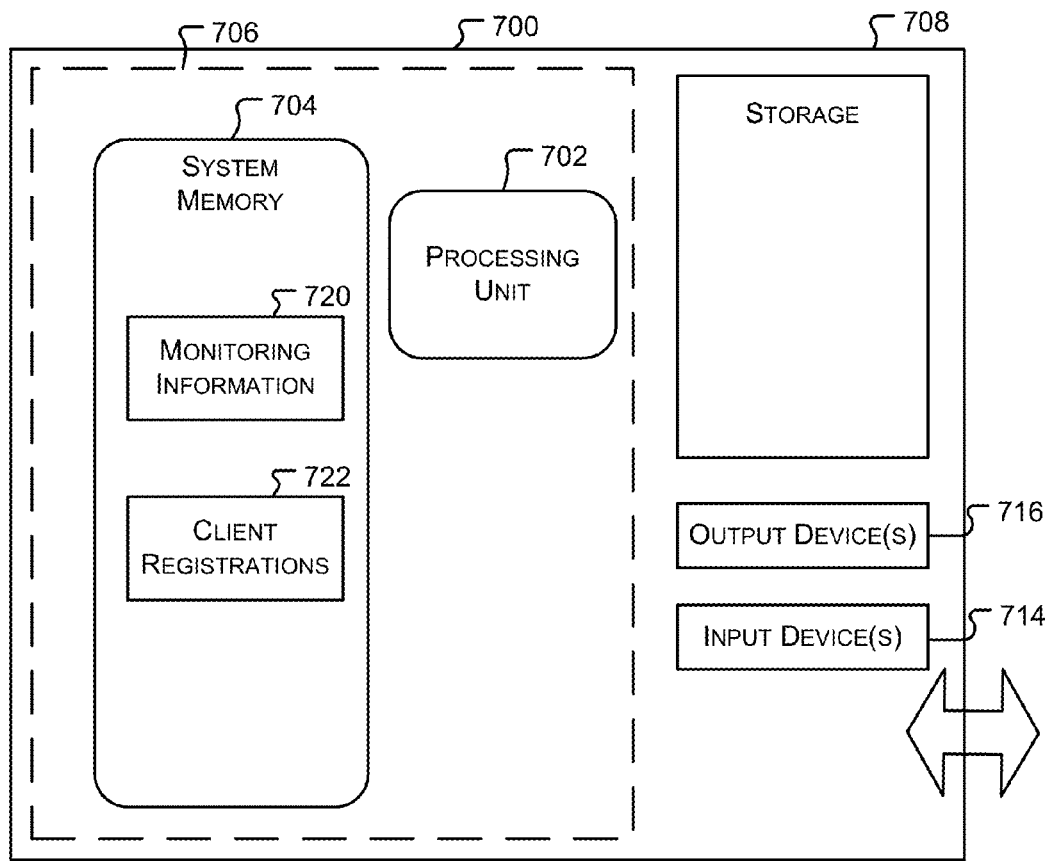
FIG. 7 illustrates a block diagram of a computing environment suitable for implementing embodiments.

FIG. 7 illustrates a general computer system 700, which can be used to implement the embodiments described herein. The computer system 700 is only one example of a computing environment and is not intended to suggest any limitation as to the scope of use or functionality of the computer and network architectures. Neither should the computer system 700 be interpreted as having any dependency or requirement relating to any one or combination of components illustrated in the example computer system 700. In embodiments, system 700 may be used as a client and/or server described above with respect to FIG. 1.

In its most basic configuration, system 700 typically includes at least one processing unit 702 and memory 704. Depending on the exact configuration and type of computing device, memory 704 may be volatile (such as RAM), non-volatile (such as ROM, flash memory, etc.) or some combination of the two. This most basic configuration is illustrated in FIG. 7 by dashed line 706. System memory 704 stores applications that are executing on system 700. For example, memory 704 may store information 720 regarding resources that are being monitored. Memory 704 may also include the client registrations 722 for notifications.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage, and non-removable storage 708 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 714 such as a keyboard, a mouse, a pen, a sound input device, a touch input device, etc. Output device(s) 716 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Reference has been made throughout this specification to "one embodiment" or "an embodiment," meaning that a particular described feature, structure, or characteristic is included in at least one embodiment. Thus, usage of such phrases may refer to more than just one embodiment. Furthermore, the described features, structures, or characteristics may be combined in any suitable manner in one or more embodiments.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

While example embodiments and applications have been illustrated and described, it is to be understood that the embodiments are not limited to the precise configuration and resources described above. Various modifications, changes, and variations apparent to those skilled in the art may be made in the arrangement, operation, and details of the methods and systems disclosed herein without departing from the scope of the claimed embodiments.

We claim:

1. A computer implemented method of providing state notifications to a client, the method comprising:
    receiving at a first node a request to connect to the first node to access information on the first node, wherein the first node is one of a plurality of nodes in a cluster;
    sending a response from the first node, the response establishing a session for accessing information on the first node;
    receiving a second request for node information regarding the plurality of nodes;
    in response to the second request, sending a second response with the node information, wherein the node information identifies at least two nodes of the plurality of nodes that serve as witness nodes for monitoring a resource and further identifies a ranking for each of the at least two nodes;
    receiving a registration request at the first node to register for notifications regarding at least one resource, wherein the first node serves as a first witness node and monitors the at least one resource; and
    sending from the first node, a notification with the state of the at least one resource.

2. The method of claim 1, wherein the resource is a network resource and the first node receives events from the network resource.

3. The method of claim 2, wherein the resource is a cluster resource and the first node receives events from a cluster service running on the cluster.

4. The method of claim 1, wherein the notification indicates a failure of the at least one resource.

5. The method of claim 1, wherein the request to connect to the first node and the response establishing a session for accessing information on the first node are formatted according to a file access protocol.

6. The method of claim 5, wherein the second request for node information, the second response with the node information, the registration request, and the notification are formatted according to a witness protocol that is different from the file access protocol.

7. The method of claim 6, wherein the witness protocol uses report procedure calls (RPC) over a transmission control protocol (TCP) transport.

8. The method of claim 1, wherein the node information identifies a plurality of nodes that serves as witness nodes.

9. The method of claim 1, further comprising receiving an unregister request to unregister for the notifications at the first node.

10. A computer storage device comprising computer executable instructions that when executed by a processor perform a method of receiving state notifications, the method comprising:
    sending a request to connect to a first file server, wherein the first file server is one of a plurality of file servers in a cluster;
    receiving a response from the first file server indicating the establishment of a session for accessing file information stored on the first file server;
    sending a first plurality of requests to access files on the first file server;
    transmitting a second request to the first file server for witness information, wherein the witness information provides identifying information for a second file server of the plurality of file servers in the cluster, wherein the second file server provides a witness service that monitors at least one resource;
    receiving a message with the witness information, wherein the witness information identifies at least two additional file servers providing the witness service and further identifies a ranking for each of the at least two additional file servers;
    based on the witness information, transmitting a request to at least one of the at least two additional file servers to register for notifications with the state of the at least one resource; and
    receiving a notification with the state of the at least one resource.

11. The computer storage device of claim 10, wherein the resource is a resource of the first file server.

12. The computer storage device of claim 11, wherein the notification indicates a failure of the first file server.

13. The computer storage device of claim 12, further comprising, in response to the notification:
    pausing any additional file access requests to the first file server;
    receiving a message indicating the availability of a third file server of the plurality of file servers in the cluster; and
    sending a second plurality of file access requests to the third file server.

14. The computer storage device of claim 10, wherein the first request to connect to a first file server, the response from the first file server indicating the establishment of a session, and the first plurality of requests to access files are transmitted over a first communication channel.

15. The computer storage device of claim 14, wherein the first request to connect to the first file server, the response from the first file server indicating the establishment of a session, and the first plurality of requests to access files are formatted according to a file access protocol.

16. The computer storage device of claim 15, wherein the file access protocol comprises a version of the server message block (SMB) protocol.

17. The computer storage device of claim 15, wherein the second request, the message with the witness information, the request to the second file server to register for state notifications, and the notification are transmitted using a second communication channel different from the first communication channel.

18. A computer system for providing client communication services, the system comprising:
    a plurality of servers in a cluster, wherein at least a portion of the plurality of servers are configured to:
        establish a session for providing access to file information stored on the server;
        store witness information identifying at least two other servers in the plurality of servers that provide a witness service and further identifying an order for each of the at least two servers;
        provide a list of each of the servers in the plurality of servers that provide the witness information;
        monitor events regarding at least one resource;
        receive a registration request to register for notifications regarding the at least one resource; and
        send notifications with the state of the at least one resource.

19. The system of claim 18, wherein the resource is a cluster resource and the server receives events from a cluster service running on the cluster.

20. The system of claim 19, wherein the notification indicates a failure of the at least one resource.

* * * * *